US012745220B2

(12) United States Patent
Peng et al.

(10) Patent No.: US 12,745,220 B2
(45) Date of Patent: Sep. 22, 2026

(54) RESOURCE OVERHEAD DETERMINING METHOD AND RELATED DEVICE

(71) Applicant: VIVO MOBILE COMMUNICATION CO., LTD., Dongguan (CN)

(72) Inventors: Shuyan Peng, Dongguan (CN); Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 588 days.

(21) Appl. No.: 17/956,812

(22) Filed: Sep. 29, 2022

(65) Prior Publication Data

US 2023/0025146 A1 Jan. 26, 2023

Related U.S. Application Data

(63) Continuation of application No. PCT/CN2021/085814, filed on Apr. 7, 2021.

(51) Int. Cl.

| | |
|---|---|
| ***H04W 72/02*** | (2009.01) |
| ***H04L 1/00*** | (2006.01) |
| ***H04L 5/00*** | (2006.01) |
| ***H04W 72/0453*** | (2023.01) |
| ***H04W 72/20*** | (2023.01) |

(52) U.S. Cl.

CPC .......... *H04W 72/02* (2013.01); *H04L 1/0003* (2013.01); *H04L 5/0051* (2013.01); *H04W 72/0453* (2013.01); *H04W 72/20* (2023.01)

(58) Field of Classification Search

CPC . H04W 72/02; H04W 72/0453; H04W 72/20; H04L 1/0003; H04L 5/0051; H04L 1/0009; H04L 5/0053

See application file for complete search history.

(56) References Cited

U.S. PATENT DOCUMENTS

2022/0377722 A1* 11/2022 Yao ...................... H04L 5/0055

FOREIGN PATENT DOCUMENTS

| | | |
|---|---|---|
| CN | 110505703 A | 11/2019 |
| WO | 2020017885 A1 | 1/2020 |
| WO | 2020030056 A1 | 2/2020 |

OTHER PUBLICATIONS

International Search Report issued in corresponding International Application No. PCT/CN2021/085814, mailed Jul. 7, 2021, 4 pages.

Panasonic, "Discussion on physical layer structure for sidelink in NR V2X", 3GPP TSG RAN WG1 #99, R1-1912752, Nov. 22, 2019.

Ericsson, "Physical layer structure for NR sidelink", 3GPP TSG-RAN WG1 Meeting #100-e, R1-2001007, Mar. 6, 2020.

QUALCOMM Incorporated, "Considerations on Physical Layer aspects of NR V2X", 3GPP TSG-RAN WG1 Meeting #100-e, R1-2000962, Mar. 6, 2020.

First Office Action issued in related Chinese Application No. 202010266511.3, mailed Apr. 2, 2022, 9 pages.

* cited by examiner

*Primary Examiner* — Eric Myers

(74) *Attorney, Agent, or Firm* — IPX PLLC

(57) ABSTRACT

A resource overhead determining method and a related device are provided. The method includes: determining a resource overhead of second-stage Sidelink Control Information (SCI) according to a first parameter, where the first parameter includes a first Transport Block Size (TBS) and/or a resource overhead of a DeModulation Reference Signal (DMRS).

20 Claims, 2 Drawing Sheets

RESOURCE OVERHEAD DETERMINING METHOD AND RELATED DEVICE

CROSS-REFERENCE TO RELATED APPLICATIONS

This application is a continuation of International Application No. PCT/CN2021/085814, filed on Apr. 7, 2021, which claims priority to Chinese Patent Application No. 202010266511.3, filed on Apr. 7, 2020. The entire contents of each of the above-identified applications are expressly incorporated herein by reference.

TECHNICAL FIELD

The present disclosure relates to the field of wireless communications technologies, and in particular, to a resource overhead determining method and a related device.

BACKGROUND

In a wireless communication system, a terminal can directly transmit data with other terminals through a sidelink without a network side device (for example, a base station). For example, in an Internet of vehicles system, an intelligent in-vehicle device of a vehicle can transmit data with a terminal used by a pedestrian on the roadside or an intelligent in-vehicle device of another vehicle through a sidelink.

When a terminal transmits data with a receiving end through a sidelink, for example, transmits data on a sidelink that supports Hybrid Automatic Repeat reQuest (HARQ), if initial data transmission (that is, initial transmission) fails, the terminal may retransmit data of the same transport block to the receiving end at least once (that is, retransmission). Retransmitted information may be the same as or different from initially transmitted information. However, a resource overhead of second-stage Sidelink Control Information (SCI) calculated in initial data transmission and data retransmission of the terminal may be inconsistent, resulting in data transmission failure, thereby reducing reliability of data transmission by the terminal through the sidelink.

SUMMARY

According to a first aspect, an embodiment of the present disclosure provides a resource overhead determining method, applied to a terminal, including:

determining a resource overhead of second-stage Sidelink Control Information (SCI) according to a first parameter, where the first parameter includes a first Transport Block Size (TBS) and/or a resource overhead of a DeModulation Reference Signal (DMRS).

According to a second aspect, an embodiment of the present disclosure further provides a terminal, including:

a determining module, configured to determine a resource overhead of second-stage SCI according to a first parameter, where the first parameter includes a first TBS and/or a resource overhead of a DMRS.

According to a third aspect, an embodiment of the present disclosure further provides a terminal, including a memory, a processor, and a computer program stored in the memory and executable on the processor, and when the computer program is executed by the processor, steps of the resource overhead determining method in the first aspect are implemented.

According to a fourth aspect, an embodiment of the present disclosure further provides a computer-readable storage medium, where the computer-readable storage medium stores a computer program, and when the computer program is executed by a processor, steps of the resource overhead determining method in the first aspect are implemented.

DETAILED DESCRIPTION

The following describes the technical solutions in the embodiments of the present disclosure with reference to the accompanying drawings. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term “include” and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, “and/or” used in the description and the claims means at least one of the connected objects. For example, A and/or B represents the following three cases: Only A exists, only B exists, and both A and B exist.

In the embodiments of the present disclosure, the term such as “exemplary” or “for example” is used to represent an example, an instance, or a description. Any embodiment or design solution described as “exemplary” or “for example” in the embodiments of the present disclosure should not be construed as being more preferred or advantageous than other embodiments or design solutions. To be precise, the use of the term such as “exemplary” or “for example” is intended to present a related concept in a specific manner.

Embodiments of the present disclosure will be described below with reference to the accompanying drawings. The embodiments provided in the present disclosure may be applied to wireless communications systems. The wireless communications system may be a 5G system, or an Evolved Long Term Evolution (eLTE) system, or a subsequent evolved communications system.

Figure 1:
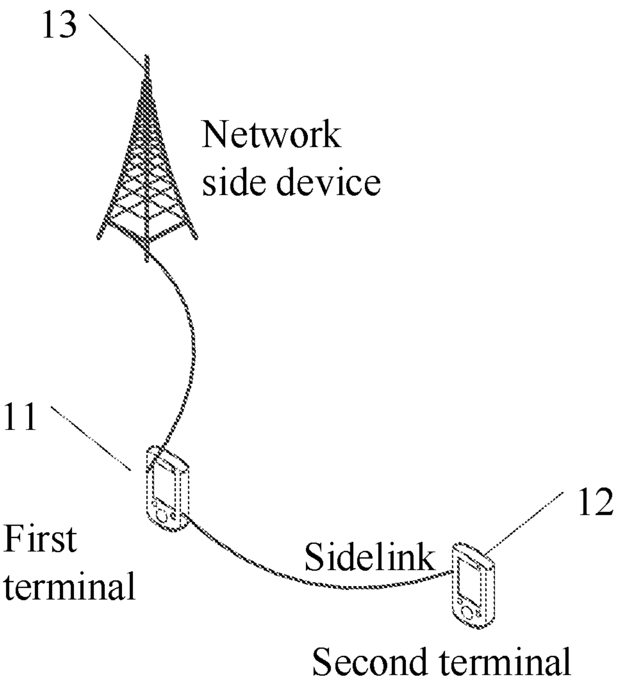
FIG. 1 is a schematic structural diagram of a network system according to an embodiment of the present disclosure.

FIG. 1 is a structural diagram of a network system according to an embodiment of the present disclosure. As shown in FIG. 1, the network system includes a first terminal 11, a second terminal 12, and a network side device 13. The first terminal 11 and the second terminal 12 may be mobile communications devices such as mobile phones, tablet personal computers, laptop computers, Personal Digital Assistants (PDA), Mobile Internet Device (MID), or wearable devices, or can be intelligent in-vehicle devices of vehicles, Roadside Unit (RSU), or infrastructures. It should be noted that a specific type of the terminal 11 is not limited in this embodiment of the present disclosure.

The first terminal 11 and the second terminal 12 can directly perform data transmission through a sidelink (for example, the first terminal 11 can be a data sending end and the second terminal 12 can be a data receiving end; or the first terminal 11 is a data receiving end and the second terminal 12 is a data sending end). For example, in a case that the first terminal 11 is an intelligent in-vehicle device of a vehicle, the intelligent in-vehicle device of the vehicle can directly transmit data with the second terminal 12, and the second terminal 12 may be an intelligent in-vehicle device of another vehicle, a roadside unit, or an infrastructure or the like.

Besides, the network side device 13 may be a 5G network side device (for example, a gNB or a 5G NR NB), or may be a 4G network side device (for example, an eNB), or may be a 3G network side device (for example, an NB), or a network side device in a subsequent evolved communications system. It should be noted that a specific type of the network side device 13 is not limited in the embodiments of the present disclosure.

Figure 2:
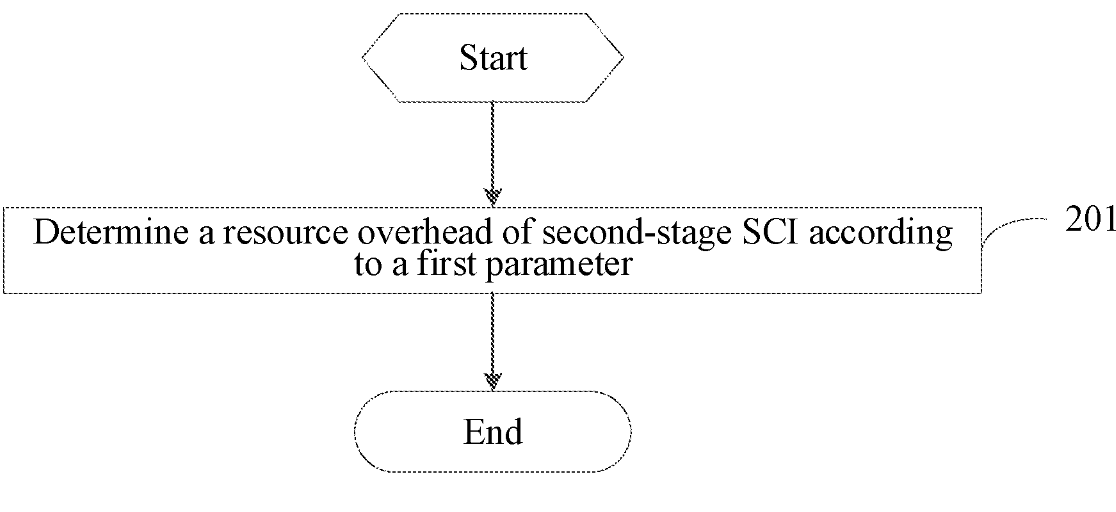
FIG. 2 is a schematic flowchart of a resource overhead determining method according to an embodiment of the present disclosure.

Refer to FIG. 2. FIG. 2 is a schematic flowchart of a resource overhead determining method according to an embodiment. The method is applied to a terminal. As shown in FIG. 2, the resource overhead determining method includes the following steps:

Step 201: Determine a resource overhead of second-stage sidelink control information according to a first parameter.

The first parameter includes at least one of a first TBS) and a resource overhead of a DMRS.

It should be noted that when a terminal transmits data through a sidelink, such as transmits data on a sidelink that supports a hybrid automatic repeat request, it is necessary to ensure that reference resource overheads of second-stage SCI calculated in initial transmission and retransmission are the same, so that a receiving end (such as other terminals) can combine initially transmitted data and retransmitted data when receiving the initially transmitted data and the retransmitted data, so as to obtain gains and realize normal transmission of the data.

In addition, the resource overhead of the second-stage SCI should be understood as a resource overhead actually used by the second-stage SCI that calculated by the terminal during data transmission.

Herein, the terminal can determine a resource overhead of the second-stage SCI according to at least one of the TBS and the resource overhead of the DMRS, so that the resources of the second-stage SCI can be obtained. Besides, TBSs calculated in the initial transmission and the retransmission can be the same, so that the terminal can combine data, thereby improving the reliability of data transmission of the terminal. Besides, the resource overhead of the second-stage SCI needs to be calculated, that is, the actually used resources of the second-stage SCI. The terminal can perform mapping of the second-stage SCI information and mapping of data information according to the resources of the second-stage SCI, that is, complete mapping of a Physical Sidelink Shared CHannel (PSSCH). In this way, it can be ensured that a sending end and a receiving end have the same understanding, and send and receive information of the second-stage SCI and data information at corresponding positions.

It should be noted that when the terminal performs data transmission through the sidelink, the sidelink can support two-stage SCI configuration, that is, the first-stage SCI is carried on a Physical Sidelink Control CHannel (PSCCH), and the second-stage SCI is carried on a PSSCH. A Resource Element (RE), that is, a resource overhead occupied by the second-stage SCI can be determined according to a TBS, a beta value, a number of available symbols, and a Modulation and Coding Scheme (MCS). The number of available symbols can be determined according to the resource overhead of the DMRS. Therefore, the calculation of the resource overhead of the second-stage SCI is also related to the resource overhead of the DMRS.

In some embodiments, the resource overhead of the second-stage SCI can be calculated according to the following formula (1):

$$Q'_{SCI2} = \min\left\{\left\lceil \frac{(O_{SCI2} + L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r} \right\rceil, \left\lceil \alpha \sum_{l=0}^{N_{symbol}^{PSSCH}-1} M_{sc}^{SCI2}(l) \right\rceil \right\} + \gamma \quad (1)$$

Herein, $(O_{SCI2}+L_{SCI2})$ represents the size of the second-stage SCI;

$$\beta_{offset}^{SCI2}$$

represents the beta value, which may be a value indicated by the first-stage SCI;

$$\sum_{l=0}^{N_{symbol}^{PSSCH}-1} M_{sc}^{SCI2}(l)$$

represents the number of available symbols, which can be determined according to the resource overhead of the DMRS;

$$\sum_{r=0}^{C_{SL-SCH}-1} K_r$$

represents the first TBS; and

α indicates a parameter configured by the network side.

It should be noted that, on the sidelink, the first-stage SCI and the second-stage SCI respectively correspond to different SCI formats, that is, it may be defined in the protocol that SCI of different SCI formats on the sidelink is the first-stage SCI or the second-stage SCI, or it may be defined that SCI of different SCI formats on the sidelink is SCI format 0-1 (that is, the first-stage SCI) and SCI format 0-2 or SCI format 0-2-x (that is, the second-stage SCI).

In some implementations, the first TBS is a reference TBS, the reference TBS may be determined according to a second parameter, and the second parameter includes at least one of the following:

- a modulation order $Q_m$;
- a code rate R;
- a number of reference symbols $N_{symb}$ of a PSSCH;
- a frequency-domain resource size $N_{PRB}$ indicated by first-stage SCI;
- a number of subcarriers $N_{SC}$ in a Physical Resource Block (PRB), for example, $N_{SC}$ is 12; and
- an MCS.

It should be noted that, the reference symbol of the PSSCH may be a symbol defined by the protocol and used for calculating the TBS.

In addition, when the reference TBS is determined according to the number of reference symbols of the PSSCH, the resource overhead corresponding to the PSFCH is subtracted from all slots in the data transmission process, or the resource overhead corresponding to the PSFCH is not considered in all slots.

In this implementation, the reference TBS is determined according to a second parameter, and the reference TBS may be calculated according to a calculation formula defined or configured in a protocol.

In some embodiments, the reference TBS is: a product of the modulation order, the code rate, the number of reference symbols of the PSSCH, the number of subcarriers in the PRB, and the frequency-domain resource size; that is, the TBS is calculated by the following formula (2).

$$TBS=Q_m \cdot R \cdot N_{symb} \cdot N_{PRB} \cdot N_{SC} \quad (2)$$

In some embodiments, the first TBS is: an integer multiple of a product of the code rate, the number of reference symbols of the PSSCH, the number of subcarriers in the PRB, and the frequency-domain resource size. In some embodiments, the integer multiple may be two, that is, the reference TBS is calculated by the following formula (3).

$$TBS=(Q_m \cdot R \cdot N_{symb} \cdot N_{PRB})/(Q_m/2) \cdot N_{SC}=2 \cdot R \cdot N_{symb} \cdot N_{PRB} \cdot N_{SC} \quad (3)$$

In some other implementations, the first TBS may also be a used TBS, that is, the terminal can obtain the resource overhead of the second-stage SCI according to an actually used TBS.

It should be noted that when the terminal performs data transmission through the sidelink, the TBS may be determined according to the number of available resources, and the number of available resources is calculated according to the total number of resources minus a resource overhead. The resource overhead includes the resource overhead of the second-stage SCI. Therefore, the calculation of the TBS is related to the resource overhead of the second-stage SCI. For example, the reference TBS can be calculated through the reference resource overhead of the second-stage SCI. The resource overhead of the second-stage SCI is calculated according to formula (1).

$$\sum_{r=0}^{C_{SL-SCH}-1} K_r$$

in the formula represents the first TBS. Therefore, the resource overhead of the second-stage SCI is related to the TBS, and in some embodiments, the resource overhead of the second-stage SCI can be determined based on the used TBS.

It can be seen from the above that the calculation of TBS is related to the resource overhead of the second-stage SCI, and the resource overhead of the second-stage SCI is related to the TBS. In addition, the first TBS can be the reference TBS or the used TBS. Therefore, the calculation of the TBS and the calculation of the resource overhead of the second-stage SCI can include at least the following three methods:

Method 1: The first TBS is the used TBS. At this time, the terminal can calculate the resource overhead of the second SCI according to the used TBS by using the above formula (1).

Method 2: The terminal calculates by using the above formula (1), determines the resource overhead of the second-stage SCI according to the reference TBS, and then determines the used TBS according to the resource overhead of the second-stage SCI. In this case, the TBS is the reference TBS, the resource overhead of the second-stage SCI is the reference resource overhead of the second-stage SCI, and the resource overhead of the second-stage SCI is determined based on the used TBS.

Method 3: The terminal can calculate the reference TBS according to the reference resource overhead of the second-stage SCI, then determine the resource overhead of the second-stage SCI according to the reference TBS (that is, calculated by the above formula (1)), and finally determine the used TBS according to the resource overhead of the second-stage SCI.

It should be noted that in the calculation process of the TBS, the resource overhead may further include: at least one of a resource overhead of Automatic Gain Control (AGC), a resource overhead of a Guard Period (GP), a resource overhead of a Physical Sidelink Feedback CHannel (PSFCH), a resource overhead of a Channel State Information Reference Signal (CSI-RS), a resource overhead of a DeModulation Reference Signal (DMRS), a resource overhead of a Physical Sidelink Shared CHannel (PSCCH), and a resource overhead of a Phase Tracking Reference Signal (PTRS). This is not limited herein.

In the above formula (1), $$\sum_{l=0}^{N_{symbol}^{PSSCH}-1} M_{sc}^{SCI2}(l)$$

in at least one of $$\left\lceil \frac{(O_{SCI2}+L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r} \right\rceil \text{ and } \left\lceil \alpha \sum_{l=0}^{N_{symbol}^{PSSCH}-1} M_{sc}^{SCI2}(l) \right\rceil$$

is determined according to the resource overhead of the DMRS. Therefore, the resource overhead of the second-stage SCI may also be calculated according to the resource overhead of the DMRS, and the resource overhead of the DMRS may be a resource overhead defined by the protocol and used for calculating the TBS. #

It should be noted that the resource overhead of the DMRS can be a resource overhead defined or configured in the protocol, and resource overheads of the DMRS corresponding to $$\left\lceil \frac{(O_{SCI2}+L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r} \right\rceil \text{ and } \left\lceil \alpha \sum_{l=0}^{N_{symbol}^{PSSCH}-1} M_{sc}^{SCI2}(l) \right\rceil$$

may be different.

In some implementations, the resource overhead of the DMRS includes at least one of the following:

- a resource overhead of the DMRS indicated by the first-stage SCI;
- a resource overhead obtained based on the DMRS indicated by the first-stage SCI; and
- a reference resource overhead of the DMRS.

Herein, the resource overhead of the DMRS may be obtained in at least one of the above methods, so that the methods of obtaining the resource overhead of the DMRS are flexible and diverse.

In this implementation, the resource overhead of the DMRS may be the resource overhead of the DMRS indicated by the first-stage SCI, or may be the resource overhead obtained based on the DMRS indicated by the first-stage SCI.

In addition, the resource overhead of the DMRS may also be the reference resource overhead of the DMRS. In some embodiments, the reference resource overhead of the DMRS may be determined according to at least one of the following:

- a number of symbols predefined by the protocol;
- a number of symbols configured by radio resource control (Radio Resource Control, RRC);
- a predefined rule; and
- a number of reference symbols of the DMRS, where the number of reference symbols of the DMRS is obtained according to a pattern of the DMRS, and the pattern of the DMRS is indicated by the first-stage SCI or a PSCCH or configured by RRC.

Herein, the terminal may determine the reference resource overhead of the DMRS in any of the foregoing methods, so that the methods of determining the reference resource of the DMRS are flexible.

In this implementation, the reference resource overhead of the DMRS may be determined according to the number of symbols predefined by the protocol; or may be determined according to the number of symbols configured by the RRC, where the number of symbols configured by the RRC may be the number of symbols configured by the network side or preconfigured by the terminal through RRC in the resource pool.

In addition, the DMRS may be determined according to a predefined rule. In some embodiments, in a case that the reference resource overhead of the DMRS is determined according to a predefined rule, the reference resource overhead of the DMRS may include: a reference resource overhead of a corresponding DMRS in a case that a PSFCH exists in each slot in a resource pool; or a reference resource overhead of a corresponding DMRS in a case that no PSFCH exists in each slot in a resource pool, so as to avoid that a PSFCH causes different reference resource overheads of the DMRS for initial transmission and retransmission.

In some embodiments, the reference resource overhead of the DMRS corresponding to the number of reference PSFCH symbols may be defined or configured in the protocol (such as configured on the network side or preconfigured by the terminal). In some embodiments, in a case that the reference resource overhead of the DMRS is determined according to a predefined rule, the reference resource overhead of the DMRS may be: the corresponding reference resource overhead of the DMRS in a case that the last N reference symbols in the resource cannot be used for the DMRS, where N−1 is the reference PSFCH overhead.

It should be noted that the last symbol in the resource is a symbol that plays a protective role, and may not be used as an overhead in the resource overhead of the PSFCH.

Certainly, the reference resource overhead of the DMRS may also be determined according to the number of reference symbols of the DMRS, and the number of reference symbols of the DMRS is obtained according to a pattern of the DMRS indicated by the first-stage SCI or a PSCCH or configured by RRC.

It should be noted that, the pattern of the DMRS indicated by the first-stage SCI or a PSCCH or configured by RRC may be a mapping rule defined or configured in the protocol (such as configured on the network side or preconfigured by the terminal). For example, if the first-stage SCI indicates a DMRS of 4 symbols, during calculation of the reference resource overhead of the second-stage SCI, the reference resource overhead of the DMRS is 3 symbols.

It should be noted that, because the resource overhead of the second-stage SCI may be determined according to the first TBS and the resource overhead of the DMRS, and the first TBS may be the reference TBS or the used TBS, the resource overhead of the second-stage SCI may be determined according to the reference TBS and the resource overhead of the DMRS, or may be determined according to the used TBS and the resource overhead of the DMRS.

In addition, the resource overhead of the DMRS used to determine the resource overhead of the second-stage SCI when the first TBS is the reference TBS may be the same as or different from a resource overhead of the DMRS used to determine the resource overhead of the second-stage SCI when the first TBS is the used TBS. This is not limited herein.

In addition, it can be seen from the above formula (1) that calculation of the resource overhead of the second-stage SCI is also associated with the beta value, and the beta value may be a value associated with the MCS. For example, the second-stage SCI can adopt Quadrature Phase Shift Keying (QPSK) coding, and transmitted data can be encoded according to MCS instruction. Therefore, considering that the modulation order $Q_m$ corresponding to the MCS used by the data TBS and the modulation order 2 used by the second-stage SCI may be different, determining of the reference resource overhead of the second-stage SCI is affected, that is, the reference beta value may be related to the modulation order $Q_m$ corresponding to the MCS. Therefore, the resource overhead of the second-stage SCI can be associated with the MCS.

For example, the beta value used to determine the resource overhead of the second-stage SCI may be a product of a beta value (which may be a value defined by a protocol, a value in the first-stage SCI, a parameter configured by RRC or a MAC CE, or a parameter indicated by DCI, or the like) and half $Q_m$ (that is, beta. $(Q_m/2)$).

It should be noted that, in a case that the resource overhead of the second-stage SCI is the reference resource overhead of the second-stage SCI, the calculation of the resource overhead of the second-stage SCI may also be associated with the number of available resources $$\sum_{l=0}^{N_{symbol}^{PSSCH}-1} M_{sc}^{SCI2}(l).$$

The number of available resources used for calculating the reference resource overhead of the second-stage SCI may be different from or the same as the number of available resources used for calculating the resource overhead of the second-stage SCI. This is not limited herein.

In order to facilitate the understanding of the resource overhead determining method, the actual application process of the resource overhead determining method is illustrated herein by an example. The examples 1 to 3 are as follows:

Example 1

The protocol predefines that the resource of the second-stage SCI is calculated based on the beta value and the reference TBS.

The beta value is the parameter indicated in the first-stage SCI, and the reference TBS is calculated according to the formula $Q_m \cdot R \cdot N_{symb} \cdot N_{PRB} \cdot N_{SC}$ (that is, the above formula (2)).

Relevant parameters are defined as follows:

$Q_m$ and R are obtained according to the MCS indicated in the first-stage SCI;

$N_{symb}$ is determined according to the assumed PSFCH overheads, that is, the reference PSFCH overhead is subtracted from the number of PSSCH symbols;

$N_{PRB}$ is the frequency-domain resource size indicated in the first-stage SCI; and $N_{SC}$ is the number of subcarriers in the physical resource block PRB, for example, $N_{SC}$ is 12.

Then, the number of resources available for the second-stage SCI (that is, the number of available symbols) is obtained according to the number of reference DMRS resources, where the number of reference DMRS resources is obtained according to the value preconfigured by the RRC.

The obtained reference TBS, the beta indicated by the first-stage SCI, and the number of resources available for the second-stage SCI are substituted into the following formula to calculate the resource M2 of the second-stage SCI.

$$Q'_{SCI2} = \min\left\{\left\lceil \frac{(O_{SCI2} + L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r} \right\rceil, \left\lceil \alpha \sum_{l=0}^{N_{symbol}^{PSSCH}-1} M_{sc}^{SCI2}(l) \right\rceil\right\} + \gamma$$

If a sending end (that is, the terminal) schedules the transmission of a data packet, the sending end obtains the resource M2 REs (that is, the reference resource overhead of the second-stage SCI) of the second-stage SCI according to a defined rule.

The sending end or the receiving end subtracts M2 from the PSSCH resource in one slot to calculate the PSSCH resource, so as to further calculate the actually transmitted TBS (that is, the used TBS).

It can be seen that when the terminal performs data transmission through the sidelink, the resource overhead of the second-stage SCI can be calculated according to the reference TBS, and then the used TBS can be determined according to the resource overhead of the second-stage SCI.

Example 2

The protocol predefines that the resource of the second-stage SCI is calculated based on the beta value and the reference TBS.

The beta value is the parameter indicated in the first-stage SCI, and the reference TBS is calculated according to the formula $Qm \cdot R \cdot Available_{REs}$. Relevant parameters are defined as follows:

$Q_m$ and R are obtained according to the MCS indicated in the first-stage SCI;

$Available_{REs}$ is the resources used to calculate TBS, and $Available_{REs}$ is related to the reference resource overhead M1 of the second-stage SCI (that is, the reference TBS is calculated according to the reference resource overhead of the second-stage SCI).

The reference TBS is obtained according to the reference overheads M1 of the second-stage SCI, the number of reference DMRS resources, and the following formula, where the number of reference DMRS resources is obtained according to the value preconfigured by the RRC.

$$Q'_{SCI2} = plq\left\{\left\lceil \frac{(O_{SCI2} + L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r} \right\rceil, \left\lceil \alpha \sum_{l=0}^{N_{symbol}^{PSSCH}-1} M_{sc}^{SCI2}(l) \right\rceil\right\} + \gamma\#$$

$(O_{SCI2}+L_{SCI2})$ is the size of the second-stage SCI;

$$\beta_{offset}^{SCI2}$$

a value indicated by the first-stage SCI;

$$\sum_{l=0}^{N_{symbol}^{PSSCH}-1} M_{sc}^{SCI2}(l)$$

is a resource that can be used to calculate the second-stage SCI and obtained according to the number of reference DMRS resources;

$$\sum_{r=0}^{C_{SL-SCH}-1} K_r$$

is the reference TBS; and α is a parameter configured by network.

The obtained reference TBS, the defined beta, and the number of resources available for the second-stage SCI are substituted into the above formula to calculate the resource overhead M2 of the second-stage SCI (that is, the resource overhead of the second-stage SCI). During calculation of the resource overhead M2 of the second-stage SCI, $$\sum_{l=0}^{N_{symbol}^{PSSCH}-1} M_{sc}^{SCI2}(l)$$

in the formula is obtained according to the overheads of the DMRS, and may be different from the parameter used for calculating the reference TBS.

If a sending end (that is, the terminal) schedules the transmission of a data packet, the sending end obtains the resource M2 REs of the second-stage SCI according to a defined rule.

The sending end or the receiving end subtracts M2 from the PSSCH resource in one slot to calculate the PSSCH resource, so as to further calculate the actually transmitted TBS (that is, the used TBS).

It can be seen that when the terminal performs data transmission through the sidelink, the reference TBS can be determined according to the reference resource overhead of the second-stage SCI, the resource overhead of the second-stage SCI can be calculated according to the reference TBS, and then the used TBS can be determined according to the resource overhead of the second-stage SCI.

Example 3

The protocol pre-defines that the resource overhead M2 of the second-stage SCI (that is, the resource overhead of the second-stage SCI) is calculated according to the beta value and the actual TBS (that is, the used TBS).

The beta value is a parameter indicated by the first-stage SCI.

Then, according to the actual number of DMRS resources, the number of resources available for the second-stage SCI is obtained, where the actual number of DMRS resources can be determined according to the beta value indicated by the first-stage SCI and a predefined DMRS transmission method.

The actual TBS, the beta indicated by the second-stage SCI, and the number of resources available for the second-stage SCI are substituted into the following formula to calculate the resource M2 of the second-stage SCI.

$$Q'_{SCI2} = \min \left\{ \left\lceil \frac{(O_{SCI2} + L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r} \right\rceil, \left\lceil \alpha \sum_{l=0}^{N_{symbol}^{PSSCH}-1} M_{sc}^{SCI2}(l) \right\rceil \right\} + \gamma$$

It can be seen that when the terminal performs data transmission through the sidelink, the resource overhead of the second-stage SCI can be directly calculated according to the used TBS.

Figure 3:
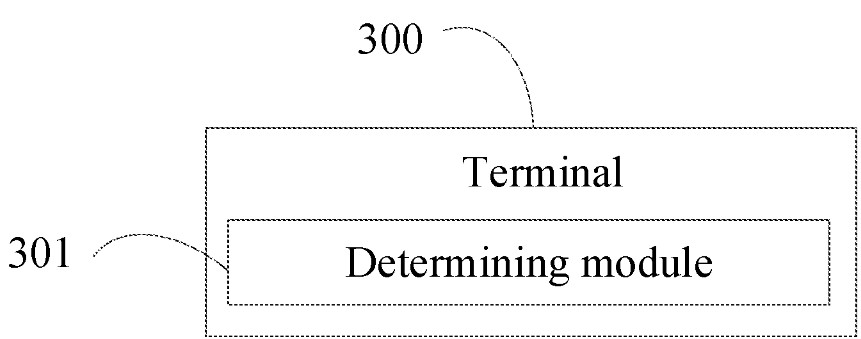
FIG. 3 is a schematic structural diagram of a terminal according to an embodiment of the present disclosure.

Referring to FIG. 3, FIG. 3 is a terminal according to an embodiment of the present disclosure. As shown in FIG. 3, a terminal 300 includes:

a determining module 301, configured to determine a resource overhead of second-stage sidelink control information SCI according to a first parameter, where the first parameter includes a first transport block size TBS and/or a resource overhead of a demodulation reference signal DMRS.

In some embodiments, the first TBS is a reference TBS, the reference TBS is determined according to a second parameter, and the second parameter includes at least one of the following:

- a modulation order $Q_m$;
- a code rate R;
- a number of reference symbols $N_{symb}$ of a PSSCH;
- a frequency-domain resource size $N_{PRB}$ indicated by first-stage SCI;
- a number of subcarriers $N_{SC}$ in a PRB; and
- an MCS.

In some embodiments, the reference TBS is: a product of the modulation order, the code rate, the number of reference symbols of the PSSCH, the number of subcarriers in the PRB, and the frequency-domain resource size; or the reference TBS is: an integer multiple of a product of the code rate, the number of reference symbols of the PSSCH, the number of subcarriers in the PRB, and the frequency-domain resource size.

In some embodiments, the resource overhead of the DMRS includes at least one of the following:

- a resource overhead of a DMRS indicated by the first-stage SCI;
- a resource overhead obtained based on the DMRS indicated by the first-stage SCI; and
- a reference resource overhead of the DMRS.

In some embodiments, the reference resource overhead of the DMRS is determined according to at least one of the following:

- a number of symbols predefined by the protocol;
- a number of symbols configured by RRC;
- a predefined rule; and
- a number of reference symbols of the DMRS, where the number of reference symbols of the DMRS is obtained according to a pattern of the DMRS, and the pattern of the DMRS is indicated by the first-stage SCI or a PSCCH or configured by RRC.

In some embodiments, in a case that the reference resource overhead of the DMRS is determined according to a predefined rule, a reference resource of the DMRS includes:

- a reference overhead of a corresponding DMRS in a case that a PSFCH exists in each slot in a resource pool; or
- a reference resource overhead of a corresponding DMRS in a case that no PSFCH exists in each slot in a resource pool.

In some embodiments, in a case that the reference resource overhead of the DMRS is determined according to a predefined rule, a reference resource overhead of the DMRS is:

- the corresponding reference overhead of the DMRS in a case that the last N reference symbols in the resource cannot be used for the DMRS, where N−1 is the reference PSFCH overhead.

In some embodiments, the resource overhead of the second-stage SCI is used to determine the used TBS.

In some embodiments, the first TBS is the used TBS.

In some embodiments, the resource overhead of the second-stage SCI is associated with the MCS.

It should be noted that the terminal 300 in this embodiment of the present disclosure may be the terminal in the implementation in the method embodiments shown in FIG. 2. Any implementation of the terminal in the method embodiments may be implemented by the terminal 300 in this embodiment of the present disclosure, and a same beneficial effect is achieved. To avoid repetition, details are not described herein again.

Figure 4:
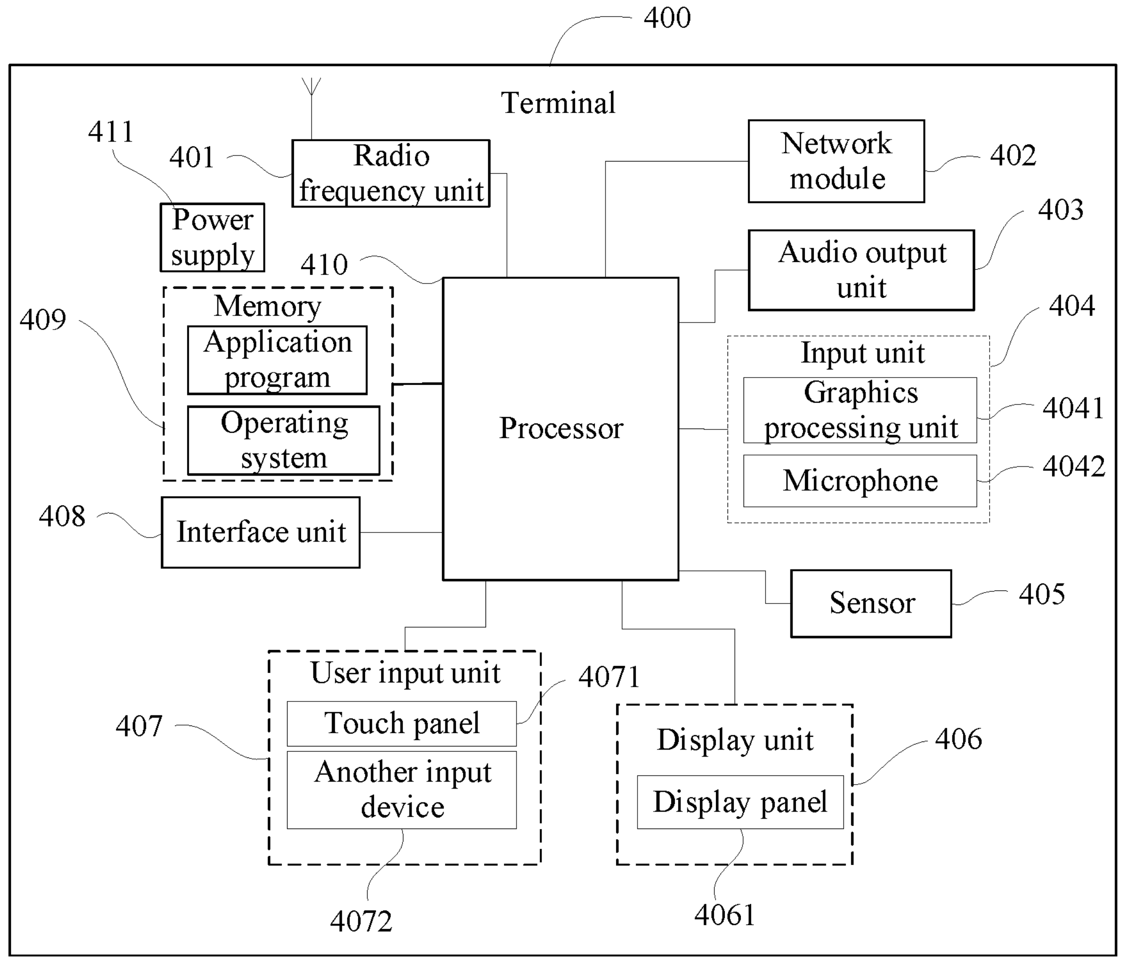
FIG. 4 is a schematic diagram of a hardware structure of a terminal according to an embodiment of the present disclosure.

FIG. 4 is a schematic diagram of a hardware structure of a terminal for implementing the embodiments of the present disclosure. The terminal 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art can understand that a structure of the terminal shown in FIG. 4 does not constitute a limitation on the terminal, where the terminal may include more or fewer components than those shown in the figure, or combine some components, or have different component arrangements.

The processor 410 is configured to:

determine a resource overhead of second-stage SCI according to a first parameter, where the first parameter includes a first TBS and/or a resource overhead of a DMRS.

In some embodiments, the first TBS is a reference TBS, the reference TBS is determined according to a second parameter, and the second parameter includes at least one of the following:

a modulation order $Q_m$;

a code rate R;

a number of reference symbols $N_{symb}$ of a PSSCH;

a frequency-domain resource size $N_{PRB}$ indicated by first-stage SCI;

a number of subcarriers $N_{SC}$ in a PRB; and an MCS.

In some embodiments, the reference TBS is: a product of the modulation order, the code rate, the number of reference symbols of the PSSCH, the number of subcarriers in the PRB, and the frequency-domain resource size; or the reference TBS is: an integer multiple of a product of the code rate, the number of reference symbols of the PSSCH, the number of subcarriers in the PRB, and the frequency-domain resource size.

In some embodiments, the resource overhead of the DMRS includes at least one of the following:

a resource overhead of a DMRS indicated by the first-stage SCI;

a resource overhead obtained based on the DMRS indicated by the first-stage SCI; and a reference resource overhead of the DMRS.

In some embodiments, the reference resource overhead of the DMRS is determined according to at least one of the following:

a number of symbols predefined by the protocol;

a number of symbols configured by RRC;

a predefined rule; and a number of reference symbols of the DMRS, where the number of reference symbols of the DMRS is obtained according to a pattern of the DMRS, and the pattern of the DMRS is indicated by the first-stage SCI or a PSCCH or configured by RRC.

In some embodiments, in a case that the reference resource overhead of the DMRS is determined according to a predefined rule, a reference resource of the DMRS includes:

reference overheads of a corresponding DMRS in a case that a PSFCH exists in each slot in a resource pool; or a reference resource overhead of a corresponding DMRS in a case that no PSFCH exists in each slot in a resource pool.

In some embodiments, in a case that the reference resource overhead of the DMRS is determined according to a predefined rule, a reference resource overhead of the DMRS is:

the corresponding reference overheads of the DMRS in a case that the last N reference symbols in the resource cannot be used for the DMRS, where N−1 is the reference PSFCH overhead.

In some embodiments, the resource overhead of the second-stage SCI is used to determine the used TBS.

In some embodiments, the first TBS is the used TBS.

In some embodiments, the resource overhead of the second-stage SCI is associated with the MCS.

It should be understood that, in this embodiment of the present disclosure, the radio frequency unit 401 may be configured to receive and send information or a signal in a call process. In some embodiments, after receiving downlink data from a base station, the radio frequency unit sends the downlink data to the processor 410 for processing. In addition, the radio frequency unit sends uplink data to the base station. Usually, the radio frequency unit 401 includes but is not limited to an antenna, at least one amplifier, a transceiver, a coupler, a low noise amplifier, a duplexer, and the like. In addition, the radio frequency unit 401 may communicate with a network and another device through a wireless communication system.

The terminal provides wireless broadband Internet access to a user through the network module 402, for example, helps the user receive and send e-mails, browse web pages, access streaming media, and the like.

The audio output unit 403 may convert audio data received by the radio frequency unit 401 or the network module 402 or stored in the memory 409 into an audio signal and output the audio signal as a sound. In addition, the audio output unit 403 may further provide an audio output (for example, a call signal received voice, or a message received voice) related to a specific function implemented by the terminal 400. The audio output unit 403 includes a speaker, a buzzer, a telephone receiver, and the like.

The input unit 404 is configured to receive an audio signal or a video signal. The input unit 404 may include a Graphics Processing Unit (GPU) 4041 and a microphone 4042. The graphics processing unit 4041 processes image data of a static image or video obtained by an image capture apparatus (for example, a camera) in a video capture mode or an image capture mode. A processed image frame may be displayed on the display unit 406. The image frame processed by the graphics processing unit 4041 may be stored in the memory 409 (or another storage medium) or sent by using the radio frequency unit 401 or the network module 402. The microphone 4042 may receive a sound and can process such sound into audio data. Processed audio data may be converted, in a call mode, into a format that can be sent to a mobile communication base station by using the radio frequency unit 401 for output.

The terminal 400 further includes at least one sensor 405, such as an optical sensor, a motion sensor, and another sensor. In some embodiments, the light sensor includes an ambient light sensor and a proximity sensor. The ambient light sensor may adjust luminance of the display panel 4061 based on brightness of ambient light. The proximity sensor may turn off the display panel 4061 and/or backlight when the terminal 400 moves to an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 405 may further include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information entered by a user or information provided for a user. The display unit 406 may include a display panel 4061, and the display panel 4061 may be configured in a form of a Liquid Crystal Display (LCD), an Organic Light-Emitting Diode (OLED), or the like.

The user input unit 407 may be configured to receive input digit or character information, and generate key signal inputs related to user settings and function instruction of the terminal. In some embodiments, the user input unit 407 includes a touch panel 4071 and another input device 4072. The touch panel 4071 is also referred to as a touchscreen, and may collect a touch operation performed by a user on or near the touch panel 4071 (for example, an operation performed by a user on the touch panel 4071 or near the touch panel 4071 by using any proper object or accessory, for example, a finger or a stylus). The touch panel 4071 may include two parts: a touch detection apparatus and a touch instructor. The touch detection apparatus detects a touch position of the user, detects a signal brought by the touch operation, and sends the signal to the touch instructor. The touch instructor receives touch information from the touch detection apparatus, converts the touch information into touch point coordinates, sends the touch point coordinates to the processor 410, and receives and executes a command sent by the processor 410. In addition, the touch panel 4071 may be implemented in various types such as a resistor, a capacitor, an infrared ray, or a surface acoustic wave. The user input unit 407 may include other input devices 4072 in addition to the touch panel 4071. In some embodiments, the another input device 4072 may include but is not limited to: a physical keyboard, a function key (such as a volume instruction key, a switch key), a trackball, a mouse, and a joystick. Details are not described herein again.

Further, the touch panel 4071 may cover the display panel 4061. When detecting the touch operation on or near the touch panel 4071, the touch panel 4071 transmits the touch operation to the processor 410 to determine a type of a touch event, and then the processor 410 provides corresponding visual output on the display panel 4061 based on the type of the touch event. In FIG. 4, the touch panel 4071 and the display panel 4061 are used as two independent components to implement input and output functions of the terminal. However, in some embodiments, the touch panel 4071 and the display panel 4061 may be integrated to implement the input and output functions of the terminal. This is not specifically limited herein.

The interface unit 408 is an interface connecting an external apparatus to the terminal 400. For example, the external apparatus may include a wired or wireless headset port, an external power supply (or battery charger) port, a wired or wireless data port, a storage card port, a port configured to connect to an apparatus having an identification module, an audio Input/Output (I/O) port, a video I/O port, a headset port, and the like. The interface unit 408 may be configured to receive input (for example, data information and power) from the external apparatus and transmit the received input to one or more elements in the terminal 400, or may be configured to transmit data between the terminal 400 and the external apparatus.

The memory 409 may be configured to store a software program and various data. The memory 409 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 409 may include a high-speed random access memory, and may further include a nonvolatile memory, for example, at least one magnetic disk storage device, a flash storage device, or another volatile solid-state storage device.

The processor 410 is an instruction center of the terminal, and is connected to all parts of the entire terminal by using various interfaces and lines, and performs various functions of the terminal and processes data by running or executing the software program and/or the module that are stored in the memory 409 and invoking the data stored in the memory 409, to implement overall monitoring on the terminal. The processor 410 may include one or more processing units. In some embodiments, the processor 410 may be integrated with an application processor and a modem processor. The application processor mainly processes an operating system, a user interface, an application program, and the like, and the modem processor mainly processes wireless communication. It can be understood that, in some embodiments, the modem processor may not be integrated into the processor 410.

The terminal 400 may further include a power supply 411 (such as a battery) that supplies power to each component. In some embodiments, the power supply 411 may be logically connected to the processor 410 by using a power management system, to implement functions such as charging, discharging, and power consumption management by using the power management system.

In addition, the terminal 400 includes some function modules not shown, and details are not described herein.

For example, an embodiment of the present disclosure further provides a terminal, including a processor 410, a memory 409, a computer program stored in the memory 409 and executable on the processor 410. When the computer program is executed by the processor 410, processes of the embodiment of the foregoing resource overhead determining method are implemented, and a same technical effect can be achieved. To avoid repetition, details are not described herein again.

It should be noted that the terminal 400 in this embodiment may be the terminal in any implementation in the method embodiment in the embodiments of the present disclosure, and any implementation of the terminal in the method embodiment in the embodiments of the present disclosure may be implemented by the foregoing terminal 400 in this embodiment, and a same beneficial effect is achieved. Details are not described herein again.

An embodiment of the present disclosure further provides a computer-readable storage medium. The computer-readable storage medium stores a computer program, and when the computer program is executed by a processor, the foregoing processes of the embodiment corresponding to the first network function, the second network function, the terminal or the base station node are implemented and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A resource overhead determining method, performed by a terminal, comprising:

determining a quantity of resource elements occupied by second-stage Sidelink Control Information (SCI) at least by:

obtaining a number of resources available for the second-stage SCI based on a number of reference DeModulation Reference Signal (DMRS) resources; and determining the quantity of resource elements occupied by the second-stage SCI based at least in part on the number of resources available for the second-stage SCI.

2. The method according to claim 1, wherein the number of the reference DMRS resources is determined according to a value configured by Radio Resource Control (RRC).

3. The method according to claim 1, wherein the quantity of resource elements occupied by the second-stage SCI is used to determine a used Transport Block Size (TBS).

4. The method according to claim 3, wherein the used TBS is determined by subtracting the quantity of resource elements occupied by the second-stage SCI from a Physical Sidelink Shared CHannel (PSSCH) resource in a slot.

5. The method according to claim 1, wherein the quantity of resource elements occupied by the second-stage SCI is associated with a Modulation and Coding Scheme (MCS).

6. The method according to claim 1, wherein the number of resources available for the second-stage SCI comprises a number of available symbols for the second-stage SCI.

7. The method according to claim 1, wherein determining the quantity of resource elements occupied by the second-stage SCI further comprises:

determining the quantity of resource elements occupied by the second-stage SCI based on a reference Transport Block Size (TBS), a beta value indicated by first-stage SCI, and the number of resources available for the second-stage SCI.

8. A terminal, comprising:

a memory storing computer-readable instructions;

a processor coupled to the memory and configured to execute the computer-readable instructions, wherein the computer-readable instructions, when executed by the processor, cause the processor to perform operations comprising:

determining a quantity of resource elements occupied by second-stage Sidelink Control Information (SCI) at least by:

obtaining a number of resources available for the second-stage SCI based on a number of reference DeModulation Reference Signal (DMRS) resources; and determining the quantity of resource elements occupied by the second-stage SCI based at least in part on the number of resources available for the second-stage SCI.

9. The terminal according to claim 8, wherein the number of the reference DMRS resources is determined according to a value configured by Radio Resource Control (RRC).

10. The terminal according to claim 8, wherein the quantity of resource elements occupied by the second-stage SCI is associated with a Modulation and Coding Scheme (MCS).

11. The terminal according to claim 8, wherein the number of resources available for the second-stage SCI comprises a number of available symbols for the second-stage SCI.

12. The terminal according to claim 8, wherein the quantity of resource elements occupied by the second-stage SCI is used to determine a used Transport Block Size (TBS).

13. The terminal according to claim 12, wherein the used TBS is determined by subtracting the quantity of resource elements occupied by the second-stage SCI from a Physical Sidelink Shared CHannel (PSSCH) resource in a slot.

14. The terminal according to claim 8, wherein determining the quantity of resource elements occupied by the second-stage SCI further comprises:

determining the quantity of resource elements occupied by the second-stage SCI based on a reference Transport Block Size (TBS), a beta value indicated by first-stage SCI, and the number of resources available for the second-stage SCI.

15. A non-transitory computer-readable medium storing instructions that, when executed by a processor, cause the processor to perform operations comprising:

determining a quantity of resource elements occupied by second-stage Sidelink Control Information (SCI) at least by:

obtaining a number of resources available for the second-stage SCI based on a number of reference DeModulation Reference Signal (DMRS) resources; and determining the quantity of resource elements occupied by the second-stage SCI based at least in part on the number of resources available for the second-stage SCI.

16. The non-transitory computer-readable medium according to claim 15, wherein the number of the reference DMRS resources is determined according to a value configured by Radio Resource Control (RRC).

17. The non-transitory computer-readable medium according to claim 15, wherein the quantity of resource elements occupied by the second-stage SCI is used to determine a used Transport Block Size (TBS).

18. The non-transitory computer-readable medium according to claim 17, wherein the used TBS is determined by subtracting the quantity of resource elements occupied by the second-stage SCI from a Physical Sidelink Shared CHannel (PSSCH) resource in a slot.

19. The non-transitory computer-readable medium according to claim 15, wherein the quantity of resource elements occupied by the second-stage SCI is associated with a Modulation and Coding Scheme (MCS).

20. The non-transitory computer-readable medium according to claim 15, wherein the number of resources available for the second-stage SCI comprises a number of available symbols for the second-stage SCI.

* * * * *